(12) United States Patent
Ajiro

(10) Patent No.: US 9,150,109 B2
(45) Date of Patent: Oct. 6, 2015

(54) BRAKING CONTROL DEVICE

(71) Applicant: Nissan Motor Co., Ltd., Yokohama-shi, Kanagawa (JP)

(72) Inventor: Keigo Ajiro, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/374,580

(22) PCT Filed: Mar. 1, 2013

(86) PCT No.: PCT/JP2013/055716
§ 371 (c)(1),
(2) Date: Jul. 25, 2014

(87) PCT Pub. No.: WO2013/133177
PCT Pub. Date: Sep. 12, 2013

(65) Prior Publication Data
US 2014/0375115 A1    Dec. 25, 2014

(30) Foreign Application Priority Data
Mar. 7, 2012   (JP) .................... 2012-049936

(51) Int. Cl.
*B60L 7/18*    (2006.01)
*B60T 1/10*    (2006.01)
(Continued)

(52) U.S. Cl.
CPC ... *B60L 7/18* (2013.01); *B60L 3/10* (2013.01); *B60L 3/108* (2013.01); *B60L 7/14* (2013.01); *B60L 7/26* (2013.01); *B60L 15/2009* (2013.01); *B60T 1/10* (2013.01); *B60T 13/58* (2013.01);
(Continued)

(58) Field of Classification Search
CPC .............. B60T 1/10; B60L 7/18; B60L 3/10; B60L 7/10; B60L 17/18; B60L 17/20; B60L 17/26; B60L 3/108; B60L 7/14
USPC ....................... 303/152, 148, 149; 701/70, 71
See application file for complete search history.

(56) References Cited

U.S. PATENT DOCUMENTS

| 6,295,487 | B1 * | 9/2001 | Ono et al. ...................... 701/71 |
| 2007/0228821 | A1 * | 10/2007 | Maki et al. ..................... 303/151 |
| 2010/0127562 | A1 * | 5/2010 | Yokoyama et al. ........... 303/151 |

FOREIGN PATENT DOCUMENTS

| JP | 2007-112426 A | 5/2007 |
| JP | 2009-190483 A | 8/2009 |

(Continued)

*Primary Examiner* — Melanie Torres Williams
(74) *Attorney, Agent, or Firm* — Global IP Counselors, LLP

(57) ABSTRACT

A braking control device, includes a regenerative braking control part, a wheel speed differential detection part, and a regenerative restriction part. The regenerative braking control part is configured to carrying out regenerative braking on the drive wheels based on a deceleration request operation. The wheel speed differential detection part is configured to determine a wheel speed differential between the driven wheel speed and the regenerative braking wheel speed. The regenerative restriction part is configured to restrict the regenerative braking amount when the wheel speed differential exceeds a restriction initiation threshold value. The regenerative restriction part, during restriction of the regenerative braking amount, is configured to repeatedly carrying out a restriction in accordance with a large restriction phase in which a decrease in gradient of the regenerative braking amount is large and a restriction in accordance with a small restriction phase in which the decrease in gradient is small.

17 Claims, 11 Drawing Sheets

(51) Int. Cl.
*B60L 3/10* (2006.01)
*B60L 7/14* (2006.01)
*B60L 7/26* (2006.01)
*B60L 15/20* (2006.01)
*B60W 10/08* (2006.01)
*B60W 10/184* (2012.01)
*B60W 30/18* (2012.01)
*B60T 13/58* (2006.01)
*B60K 28/16* (2006.01)

(52) U.S. Cl.
CPC ............ *B60W 10/08* (2013.01); *B60W 10/184* (2013.01); *B60W 30/18127* (2013.01); *B60K 28/16* (2013.01); *B60L 2240/461* (2013.01); *B60L 2240/465* (2013.01); *B60L 2240/80* (2013.01); *B60L 2250/26* (2013.01); *B60T 2270/604* (2013.01); *B60W 2520/26* (2013.01); *B60W 2710/083* (2013.01); *B60W 2720/403* (2013.01); *Y02T 10/7275* (2013.01)

(56) References Cited

FOREIGN PATENT DOCUMENTS

JP    2010-173610 A    8/2010
JP    2012-26514 A    2/2012

* cited by examiner

BRAKING CONTROL DEVICE

CROSS-REFERENCE TO RELATED APPLICATIONS

This application is a U.S. National stage application of International Application No. PCT/JP2013/055716, filed Mar. 1, 2013, which claims priority to Japanese Patent Application No. 2012-049936 filed in Japan on Mar. 7, 2012, the contents of each of which are hereby incorporated herein by reference.

BACKGROUND

1. Field of the Invention

The present invention relates to a braking control device in which a regenerative braking control part carries out regenerative braking only on the front or back drive wheels in a vehicle such as an electric or hybrid car.

2. Background Information

In the past, electrically actuated boost devices have been known in which assisted thrust is provided by an electrically powered actuator to an assist member in accordance with movement of an input member by the brake driver, generating hydraulic brake pressure that has been boosted in a master cylinder (e.g., refer to Japanese Laid-Open Patent Application No. 2007-112426).

In addition, the master cylinder pressure is supplied to the braking devices of the respective wheels at the front and rear.

SUMMARY

However, as stated above, in systems in which the braking pressure of the four wheels is controlled at the same pressure, because either the front or rear wheels are used as drive wheels, when regenerative coordinated control is carried out at the braking wheels, the following problems may arise.

Specifically, when regenerative coordinated control is carried out, the regenerative braking amount is restricted in cases where the wheel speed differential relative to the driven wheels increases due to the action of regenerative braking force and the friction braking force at the drive wheels.

When this occurs, there are cases in which the regenerative braking restriction amount is insufficient, and the braking force on the drive wheels in such cases becomes greater than the corresponding coefficient of friction of the road surface, resulting in understeering or oversteering which can have a detrimental influence on vehicle behavior.

On the other hand, if the regenerative braking restriction amount is increased in order to induce a decrease in driven wheel braking force, the amount of fluctuation in vehicle deceleration will increase due to the response lag of the friction braking force, which may induce and uncomfortable sensation in the driver.

The present invention focuses on the problems described above, and an aim of the invention is to provide a braking control device whereby it is possible to decrease changes in vehicle behavior and reduce uncomfortable sensations in the driver during restriction of the regenerative braking amount when carrying out regenerative braking control of the driven wheels which are at the front or rear.

In order to achieve the above objective, the braking control device of the present invention is a braking control device having a regenerative restriction part that restricts the regenerative braking amount when the wheel speed differential between the driven wheel speed and the regenerative braking wheel speed is greater than a restriction initiation threshold value, the regenerative restriction part, during restriction, repeatedly carrying out restriction in accordance with a large restriction phase in which the decrease in gradient of the regenerative braking amount is large and restriction in accordance with a small restriction phase in which the decrease in gradient is small.

In the present invention, during restriction of the regenerative braking amount, the regenerative restriction part repeatedly executes restriction in accordance with a large restriction phase in which the gradient of the decrease in regenerative braking amount is large and restriction in accordance with a small restriction phase in which the gradient of the decrease in the regenerative braking amount is small.

For this reason, in accordance with restriction in the large restriction phase, the braking amount at the regenerative braking wheels is equal to or less than the torque corresponding to the coefficient of friction at the road surface, inhibiting changes in vehicle behavior. In addition, in accordance with restriction in the small restriction phase, fluctuation in vehicle deceleration due to frictional response lag is suppressed, which suppresses uncomfortable sensations in the driver.

BRIEF DESCRIPTION OF THE DRAWINGS

Referring now to the attached drawings which form a part of this original disclosure.

DETAILED DESCRIPTION OF EMBODIMENTS

Embodiments of the braking control device of the present invention are described below with reference to the drawings.

(Embodiment 1)

Figure 1:
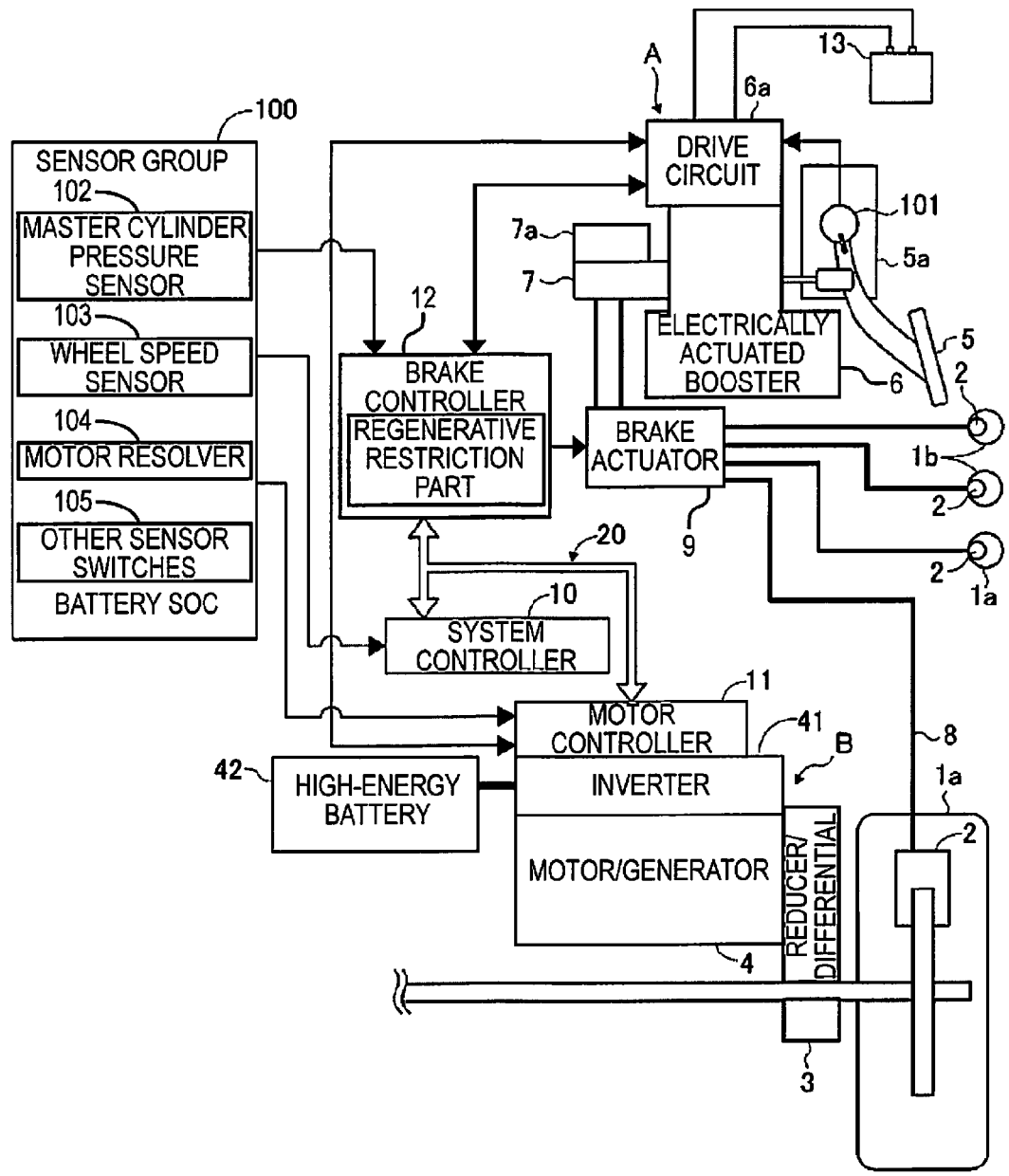
FIG. 1 is a system configuration diagram of the braking restriction device according to a first embodiment.

First, the configuration of the braking control device of a first embodiment will be described with reference to FIG. 1, which is a system configuration diagram of the braking control device.

The braking control device of the first embodiment is used in an electric car in which the drive wheels 1a, 1a are driven by a motor/generator 4, the device comprising a hydraulic braking device A, a regenerative braking device B, and a system controller 10.

First, the hydraulic braking device A will be described. The hydraulic braking device A has a brake pedal 5 that the driver depresses with a foot. The brake hydraulic pressure is generated by a master cylinder 7 in accordance with the depression force on the brake pedal 5. The brake hydraulic pressure generates frictional braking force as a result of being supplied as hydraulic braking force via a brake hydraulic line 8 to a wheel cylinder 2 that is provided on the drive wheels 1a, 1a, and the driven wheels 1b, 1b. In the first embodiment, the drive wheels 1a are the front wheels, but they may also be the rear wheels. Either the front wheels or the rear wheels must be the drive wheels.

In addition, the depression force (manipulation amount) of the brake pedal 5 is boosted by a preset boosting ratio with an electrically actuated booster 6 used as the boosting device. Braking hydraulic pressure is generated by the master cylinder 7 through conversion of the boosted input into hydraulic pressure.

The electrically actuated booster 6 and the master cylinder 7 use brake fluid contained in a reservoir tank 7a as an actuating medium. The electrically actuated booster 6 assists the pedal depression force with power from an electric motor (not shown). The electrically actuated booster 6 converts the motor torque from an electric motor into assist power using a ball screw or the like, thereby causing the assist power to act on the master cylinder piston (not shown).

A stroke sensor 101 for detecting operation of the brake pedal 5 is provided on the pedal bracket 5a of the brake pedal 5.

The master cylinder 7 adds assist power to the pedal depression force using the electrically actuated booster 6, thereby generating a master cylinder pressure (primary pressure, secondary pressure) Pmc which is conducted to the wheel cylinder 2 provided on the drive wheels 1a, 1b. The primary pressure and secondary pressure that are generated by the master cylinder 7 are conducted to a brake actuator 9.

The brake actuator 9, during a normal braking operation, conducts the master cylinder pressure Pmc as-is to the respective wheel cylinder 2. The brake actuator 9 has an internal pressurization valve and depressurization valve (not shown), and the master cylinder pressure Pmc and the depressurization/maintain/pressurization hydraulic pressure are conducted to the respective wheel cylinder 2 during ABS control in conjunction with the braking operation. During so-called VDC control or TCS control occurring in conjunction with the braking operation, the brake actuator 9 conducts, to those wheel cylinders 2 that require braking force, a controlled hydraulic pressure that is based on the pump pressure produced by a servo pump (not shown).

The respective wheel cylinders 2 are provided at the locations of the brake devices on the respective wheels 1a, 1b, and the cylinders provide braking forces to the respective wheels 1a, 1b in accordance with the hydraulic pressure that is conducted via the brake hydraulic lines 8.

Driving of the electrically actuated booster 6 and the brake actuator 9 is controlled by a brake controller 12.

The brake controller 12 determines the target deceleration based on the pedal depression force and the pedal stroke during a braking operation and outputs a drive signal to the drive circuit 6a so as to produce an assist power that will achieve the target deceleration. This brake controller 12 receives input of detection data obtained from a stroke sensor 101, a master cylinder pressure sensor 102, a motor resolver 104 and other sensor switches 105.

The drive circuit 6a converts the power source current (power source voltage) of the battery 13 into drive current (drive voltage) for the electrically actuated booster 6 in accordance with the drive signal from the brake controller 12.

The regenerative braking device B will now be described.

The regenerative braking device B converts wheel rotational energy into electrical power with a motor/generator 4 that is drivable linked via a decelerator and a differential 3 to the drive wheels 1a, 1a. Specifically, the motor/generator 4 is controlled via ac/dc conversion by an inverter 41 in accordance with a three-phase PWM signal from the motor controller (regenerative braking controller) 11. Next, in EV driving mode that requires driving of the drive wheels 1a, the drive wheels 1a are made to rotate as a result of being driven with electric power from a high-energy battery 42 using the motor/generator 4 as a motor.

On the other hand, as a result of operating the motor/generator 4 as a generator during operations requesting deceleration such as a brake pedal depression operation or acceleration pedal releasing operation, kinetic energy of the vehicle is converted to electrical energy and recovered in the high-energy battery 42.

The brake controller 12 and the motor controller 11 control the hydraulic braking device A and the regenerative braking device B in accordance with commands from the system controller 10 while communicating with the system controller 10.

The system controller (regenerative braking control part) 10 carries out regenerative coordinated braking control that prioritizes attainment of the target deceleration requested by the driver by regenerative deceleration, and carries out coordinated operations of regenerative braking and friction braking so that the deficiency resulting from regenerative deceleration is accounted for by frictional deceleration performed by the brake hydraulic pressure. Next, during regenerative coordinated braking control, control commands whereby the desired regenerative braking torque is produced are output to the motor controller 11 that is connected by a CAN communication line 20. In conjunction therewith, control commands whereby the desired frictional braking torque is produced are output to the brake controller 12.

As a result, the motor controller 11 controls the regenerative braking torque produced by the motor/generator 4 based on the regenerative braking torque command values from the system controller 10.

In addition, the brake controller 12 controls the hydraulic braking force (frictional braking force) at the wheel cylinders 2 based on command values from the system controller 10.

The sensor group 100 comprises the aforementioned stroke sensor 101, a master pressure sensor (frictional braking force detector) 102, a wheel speed sensor 103, a motor resolver 104, and other sensor switches 105.

The master cylinder pressure sensor 102 detects the master cylinder pressure Pmc.

The wheel speed sensor 103 detects each wheel speed Vw among the drive wheels 1a and the driven wheels 1b.

In addition, the motor controller 11 calculates the maximum allowed regenerative braking torque of the motor generator 4 from the battery temperature and the estimated charging capacity of the high-energy battery 42 (referred to below as battery SOC) and sends the result to the system controller 10.

Braking force control is described below.

In the first embodiment, regenerative braking coordinated control is carried out when the driver performs a braking operation. In regenerative brake cooperative control, the requested braking force is calculated based on the pedal depression force and the pedal stroke detected by the stroke sensor 101 and the master cylinder pressure sensor 102, and the calculated requested braking force is allocated to a regenerative component and a hydraulic (frictional braking) component. The allocation may be set as desired, prioritizing regenerative braking with respect to the calculated requested braking force and not using a hydraulic component as long as needs are accounted for by the regenerative component, so that braking forces resulting from regeneration contribute as much as possible. As a result, recovery of energy by regenerative braking can be realized with high energy recovery efficiency and at lower vehicle speeds, particularly with travel patterns involving repeated acceleration and deceleration.

The first embodiment is designed in order to allow all of the requested braking force to be obtained by regeneration, up to requested braking forces for which the requested braking force can be recovered by regeneration.

Specifically, the braking force front/rear allocation for the front wheel braking force and rear wheel braking force at the time of braking is typically set at the allocation that theoretically maximizes the braking force. However, with vehicles such as hybrid or electric cars, when the braking force front/rear allocation is set at this theoretical braking force allocation, it is necessary to generate a frictional braking force with the hydraulic braking devices A at the driven wheels 1$b$, 1$b$, which has the disadvantage of decreasing the amount of recovered energy and increasing fuel consumption.

Thus, in the first embodiment, all of the force up to the requested braking force that can be recovered by regeneration is obtained by regeneration. Specifically, fuel consumption is improved as much as possible by applying regenerative braking force only at the drive wheels 1$a$, 1$a$.

In the first embodiment, during regenerative braking cooperative control, the wheel speed differential S between the drive wheel speed (regenerative braking wheel speed) and driven wheel speed is used, and when the wheel speed differential S increases and drive wheel slip begins to arise, regenerative restriction control is carried out whereby the regenerative braking amount is restricted. This regenerative restriction control can be carried out at the brake controller 12 in this embodiment, but may also be carried out at the system controller 10.

Figure 2:
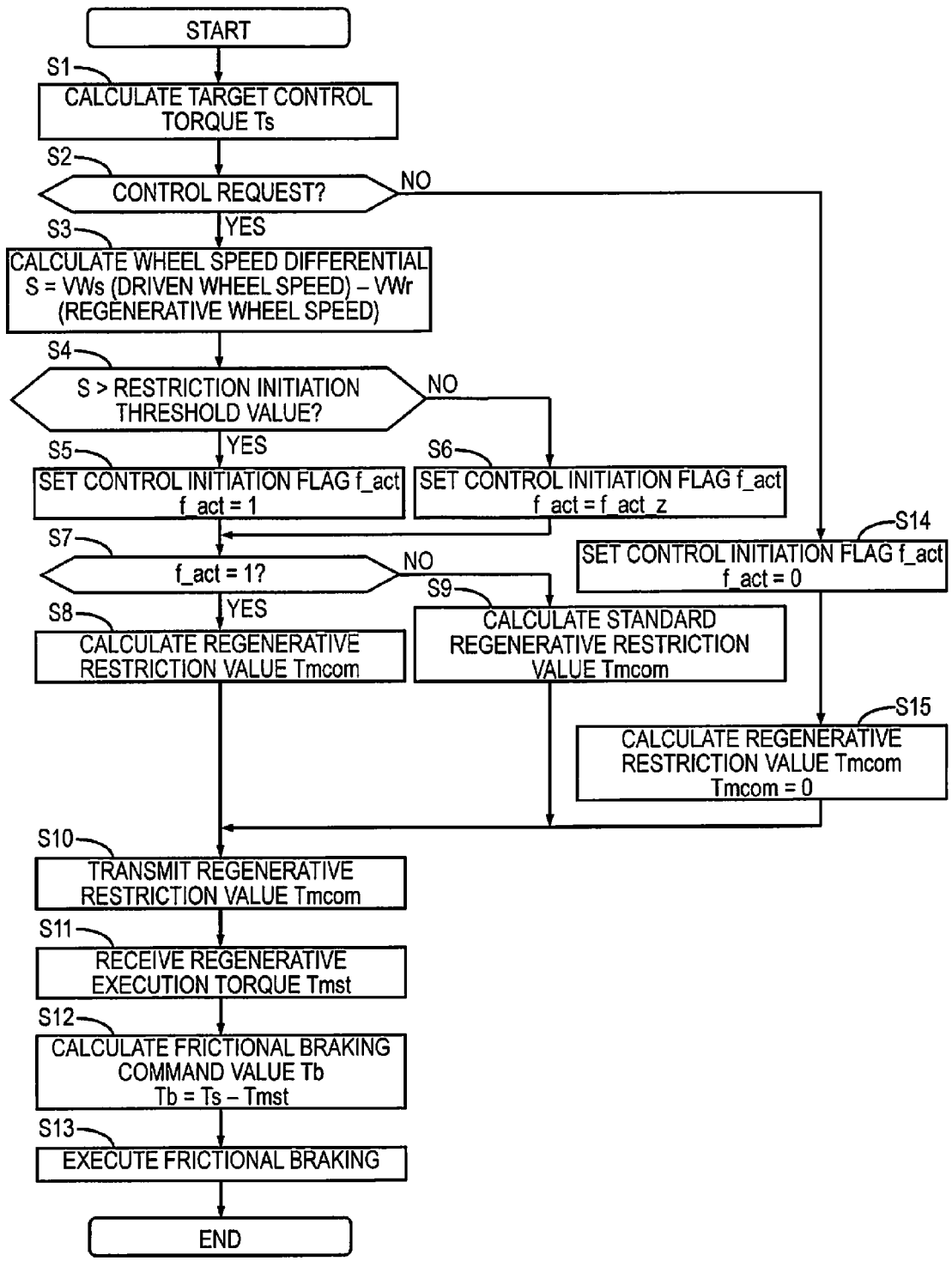
FIG. 2 is a flow chart showing the overall flow of regenerative restriction control by the braking control device according to a first embodiment.

Regenerative restriction control is described below with reference to the flow chart of FIG. 2. Regenerative restriction control is repeatedly carried out in a prescribed control period.

First, in step S1, the target braking torque Ts is computed, before proceeding to step S2. The requested braking force calculated from the aforementioned pedal depression force and the pedal stroke may be used as this target braking torque Ts.

In step S2, the presence of a braking request is determined based on the target braking torque Ts, and the routine proceeds to step S3 if a braking request is present, whereas the routine proceeds to step S14 if there is no braking request.

In step S3 that is reached if there has been a braking request, the wheel speed differential S is calculated, before proceeding to step S4.

The wheel speed differential S, as shown in formula (1) below, is determined as the difference between the driven wheel speed VWs and the regenerative wheel speed VWr.

$$S = VWs - VWr \quad (1)$$

In the subsequent step S4, it is determined whether the wheel speed differential S is greater than the restriction initiation threshold value Slim, and if S>Slim, then the routine proceeds to step S5. Otherwise, the routine proceeds to step S6.

The restriction initiation threshold value Slim is the value at which it is determined whether or not to execute regenerative restriction processing involving restricting the regenerative braking amount. The variable is set depending on the wheel speed differential S and the driven wheel speed VWs. Specifically, the restriction initiation threshold characteristic shown in FIG. 3 is preset, and the restriction initiation threshold value Slim is computed continuously during braking.

Figure 3:
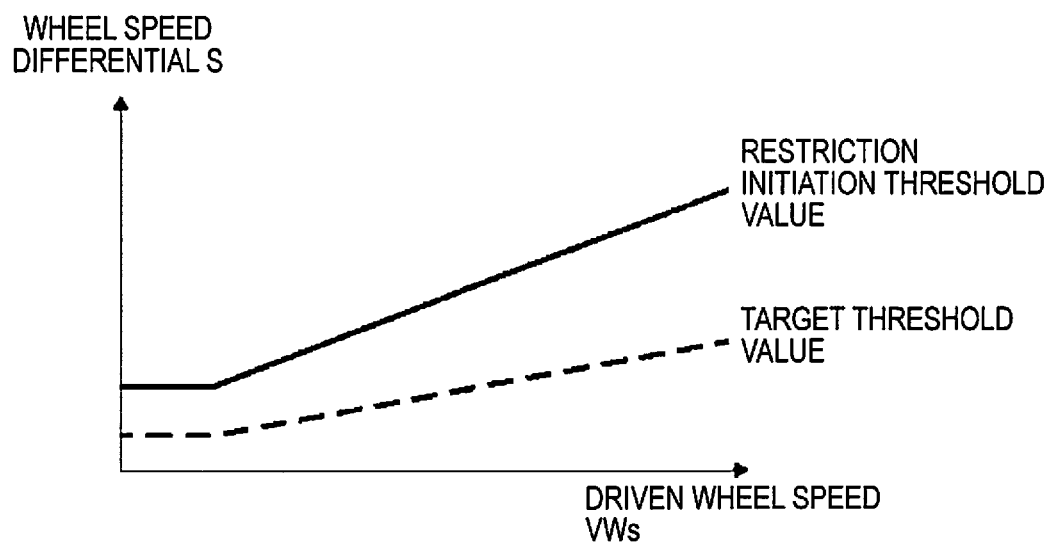
FIG. 3 is a characteristic diagram showing the restriction initiation threshold value and target threshold value in the braking control device of a first embodiment.

The target threshold value in FIG. 3 represents the differential with respect to the target driven wheel speed VWs of the drive wheel speed (regenerative braking wheel speed) VWr when the drive wheels 1$a$, 1$a$ have been braked using regenerative braking.

Next, in step S5, the control initiation flag f_act is set to 1, before proceeding to step S7. On the other hand, in step S6, the control initiation flag f_act is set to f_act_z, before proceeding to step S7. The control initiation flag f_act is a flag that is set to 1 when regenerative restriction is required. f_act_z is the previous value of the control initiation flag f_act.

In step S7, it is determined whether control initiation flag f_act=1. If f_act=1, then the routine proceeds to step S8 and, otherwise, proceeds to step S9.

In step S8, the regenerative restriction value Tmcom is calculated, before proceeding to step S10. Calculation of the regenerative restriction value Tmcom is described below.

In step S9, the standard regenerative restriction value Tmcom is calculated, before proceeding to step S10. The standard regenerative restriction value Tmcom is the value that is used when restriction (restriction in accordance with the large restriction phase or small restriction phase) has been disallowed in accordance with this embodiment, or the value that is used prior to such disallowing.

In step S10, the regenerative restriction value Tmcom is sent to the motor controller 11, before proceeding to step S11.

In step S11, the regenerative execution torque Tmst is received from the motor controller 11, before proceeding to step S12.

In step S12, the friction braking command value Tb is calculated, before proceeding to step S13.

The friction braking command value Tb is determined by subtracting the regenerative execution torque Tmst from the target braking torque Ts as shown in formula (2) below.

$$Tb = Ts = Tmst \quad (2)$$

Next, in step S14, which is reached when it is determined that there is a braking request in step S2, the control initiation flag f_act is set to 0, before proceeding to step S15. Consequently, if there is a braking request according to step S2, the wheel speed differential S is greater than the restriction initiation threshold value Slim, and the control initiation flag f_act is provisionally set to 1, and the control initiation flag f_act is maintained at 1 until the braking request is gone, whereupon f_act is switched to 0.

In step S15, the regenerative restriction value Tmcom is calculated, before proceeding to step S10. In step S15, Tmcom is taken to be 0.

(Process for Calculating Regenerative Restriction Value)

Next, the process for calculating the regenerative restriction value Tmcom in step S8 will be described using the flow chart of FIG. 4. The process for calculating the regenerative restriction value Tmcom is carried out repeatedly at a defined control period.

In step S101, the control initiation flag f_act is 1, and it is determined whether the control initiation flag f_act_z of the prior iteration is 1. If YES, then the routine proceeds to step S103, and if NO, then the routine proceeds to step S102.

In step S102, the timer count value Timer is set to 0, and the routine proceeds to step S103.

In step S103, it is determined whether the wheel speed differential S is greater than the target threshold value (refer to FIG. 3). If S is greater than the target threshold value, then the routine proceeds to step S104, whereas if S is less than the target threshold value, then the routine proceeds to step S112.

In step S104, it is determined whether the timer count Timer is 0, and if Timer=0, then the routine proceeds to step S105. If Timer 0, then the routine proceeds to step S108.

In step S105, the regenerative restriction value Tmcom is computed using formula (3) below, before proceeding to step S106.

$$Tmcom=Tmcom\_z-\text{first decrease De1} \quad (3)$$

Tmcom_z is the previous value for the regenerative restriction value Tmcom, and is the regenerative braking amount at the start of this process. In addition, the first decrease De1 is a value that produces the large decrease in gradient used in the large restriction phase and will vary in accordance with the wheel speed differential S, the variation thereof ΔS, and the lateral acceleration GY. The large decrease in gradient that is used in the large restriction phase is a decrease in gradient that is more rapid than the response speed of the hydraulic braking force of the hydraulic braking device A. Details are described below.

Next, in step S106, the timer count Timer is increased by one count, before proceeding to S107.

In step S107, the previous value is stored, and the first processing iteration ends.

Specifically, in step S107, the regenerative restriction value Tmcom_z of the prior iteration is updated to the current regenerative restriction value Tmcom, and the timer count Timer_z of the prior iteration is updated to the current count value Timer.

Next, in step S108 which is reached when the timer count Timer is not equal to 0 in step S104, the regenerative restriction value Tmcom is determined according to formula (4) below, and the routine then proceeds to step S109.

$$Tmcom=Tmcom\_z-\text{second decrease De2} \quad (4)$$

The second decrease De2 is a value that produces the small decrease in gradient used in the small restriction phase. The value varies in accordance with the wheel speed differential S, the variation thereof ΔS, and the lateral acceleration GY. The small decrease in gradient that is used in the small restriction phase is a decrease in gradient that is slower than the response speed of the hydraulic braking force of the hydraulic braking device A and includes a decrease in gradient of 0. Details thereof are described below.

In step S109, it is determined whether the timer count value Timer is larger than the timer preset value, and the routine proceeds to step S110 if Timer>timer preset value. The routine proceeds to step S111 if Timer=timer preset value. The timer preset value varies in accordance with the wheel speed differential S, the variation thereof ΔS, and the lateral acceleration GY. Details thereof are described below.

In step S110, the timer count value Timer is reset to 0, before proceeding to step S107.

In step S111, the timer count value Timer is increased by one count, before proceeding to step S107.

In step S112 which is reached when NO is determined in regard to whether wheel speed differential S≤target threshold value in step S103, the regenerative restriction value Tmcom is increased by adding the increase amount Inn to the regenerative restriction value Tmcom_z of the prior iteration. The routine then proceeds to step S113.

In step S113, the timer count value Timer is reset to 0, before proceeding to step S107.

Consequently, when the wheel speed differential S is at or below the target threshold value (determination of NO in step S103), then the regenerative restriction value Tmcom is gradually increased (step S112) by adding the increase amount INn to the regenerative restriction value Tmcom_z of the prior iteration.

On the other hand, when the wheel speed differential S increases and exceeds the target threshold value, restriction is applied to the regenerative braking amount, and the regenerative restriction value Tmcom is restricted. At this time, based on the processes of steps S103 to S111, restriction in accordance with the large restriction phase and restriction in accordance with the small restriction phase are repeated. For this reason, during restriction in the large restriction phase, the regenerative restriction value Tmcom is processed by subtracting the first decrease De1 from the regenerative restriction value Tmcom_z of the prior iteration, thus increasing the decrease in gradient. On the other hand, during restriction in the small restriction phase, the regenerative restriction value Tmcom is processed by subtracting the second decrease De2 from the regenerative restriction value Tmcom_z of the prior iteration, thus decreasing the decrease in gradient. In addition, the large restriction phase (S105) is executed in one control period, and the small restriction phase is executed from the next control period after execution of the large restriction phase up until the timer prescribed value is reached (S109→S111).

(Calculation of the First Decrease De1 and the Second Decrease De2)

Next, the decrease calculation processes whereby the first decrease De1 and second decrease De2 are calculated in steps S105 and S108 will be described using the flow chart of FIG. 5. As described above, the respective decreases De1 and De2 will vary depending on the wheel speed differential S, the variation thereof ΔS, and the lateral acceleration GY.

This decrease calculation process is repeated at a prescribed control period. First, in step S201, the separation Ss between the wheel speed differential S and the target threshold value is calculated from formula (5) below, whereupon the routine proceeds to step S202.

$$Ss=S-\text{target threshold value} \quad (5)$$

In step S202, the first decrease De1 and the second decrease De2 are calculated based on the separation Ss obtained in step S201 and the preset characteristics of the decreases De1 and De2, whereupon the routine proceeds to step S203. As shown in the drawings, the first decrease De1 is set to always be larger than the second decrease De2. In addition, the decreases De1 and De2 are constant values during the time when the separation Ss is small. When the separation Ss increases to greater than a set value Ss1, then these decreases increase in proportion to the separation Ss.

In step S203, the variation ΔS is calculated using formula (6) below from the current wheel speed differential S and the wheel speed differential S_z of the prior iteration, whereupon the routine proceeds to step S204.

$$\Delta S = S - S\_z \quad (6)$$

In step S204, the first decrease De1 and the second decrease De2 are calculated based on the preset characteristics of the decreases De1 and De2 and the variation ΔS obtained in step S203, whereupon the routine proceeds to step S205. As shown in the drawings, the first decrease De1 is set to a value that is always larger than the second decrease De2. In addition, the two decreases De1 and De2 are constant values when the variation ΔS is small, but they increase in proportion to the variation ΔS when the variation ΔS is greater than a set value ΔS1.

In step S205, the lateral acceleration GY generated in the vehicle is calculated, and the routine proceeds to step S206. This lateral acceleration GY is calculated from the signals detected by the lateral acceleration sensors among the other sensor switches 105.

In step S206, the first decrease De1 and the second decrease De2 are calculated based on the preset characteristics of the decreases De1 and De2 and the lateral acceleration GY obtained in step S205, whereupon the routine proceeds to step S207. The first decrease De1 is taken to be a value that is always larger than the second decrease De2. In addition, the first decrease De1 is a constant value when the lateral acceleration GY is less than a set value GY1, but increases in proportion to the lateral acceleration GY when a set value GY1 is exceeded, and then becomes a constant value when the lateral acceleration GY exceeds a set value GY2. The second decrease De2 is a constant value when the lateral acceleration GY reaches a set value GY3, but increases in proportion to the lateral acceleration GY when the lateral acceleration GY exceeds a set value GY3, and becomes constant when the lateral acceleration GY exceeds a set value GY4.

In step S207, the largest decreases for the first decrease De1 and the second decrease De2 obtained in steps S202, S204, and S206 are selected as the first decrease De1 and the second decrease De2, and the process of a single control period ends.

(Timer Prescribed Value Calculation)

Figure 6:
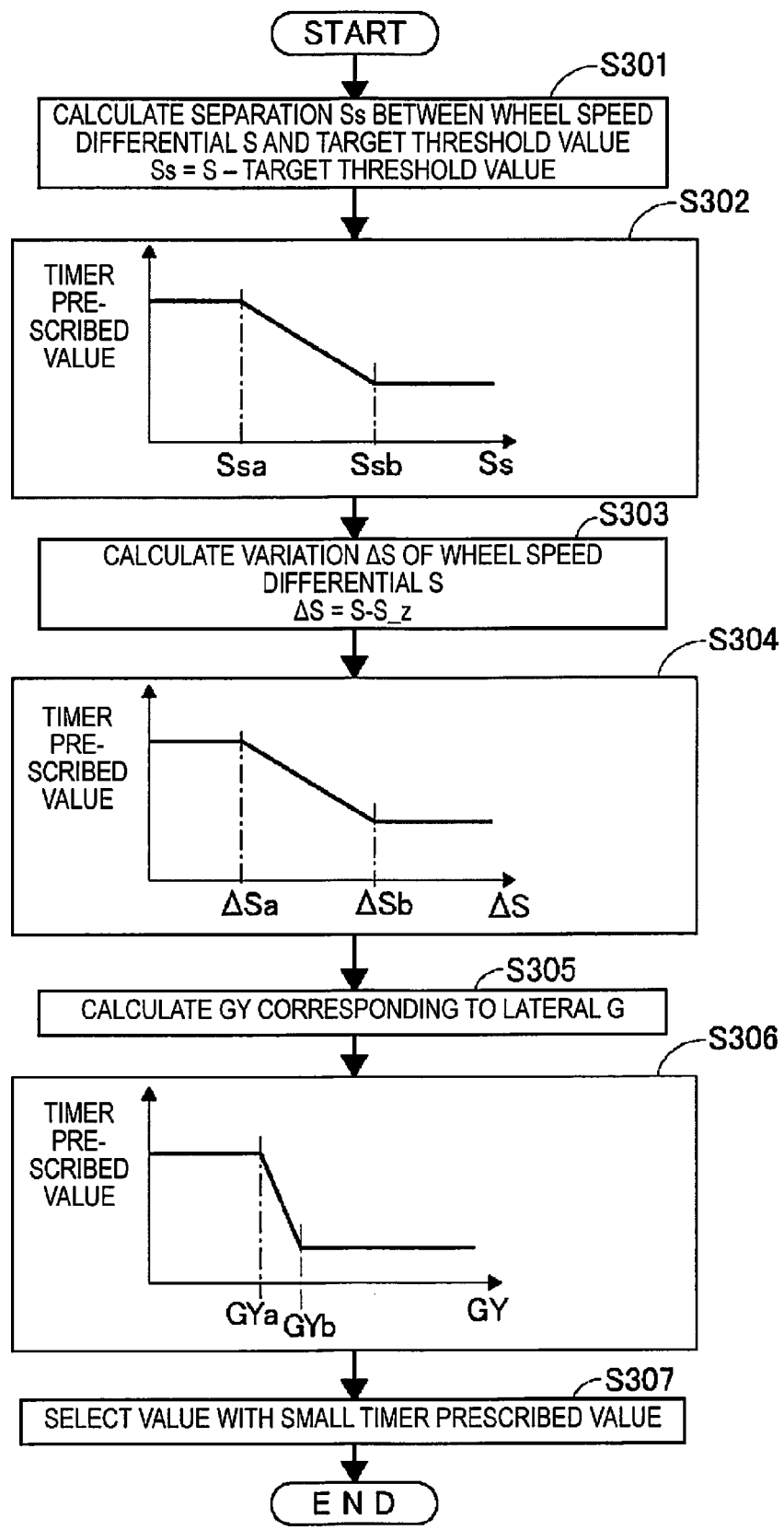
FIG. 6 is a flow chart showing the flow of computational processing for the timer preset value in the braking control device according to a first embodiment.

Next, the process for calculating the timer prescribed value used in step S109 will be described using the flow chart of FIG. 6. As described above, the timer prescribed value varies in accordance with the wheel speed differential S, the variation thereof ΔS, and the lateral acceleration GY.

Because the timer prescribed value calculation process is repeated over a prescribed control period, first, in step S301, the separation Ss between the wheel speed differential S and the target threshold value is calculated using formula (5) above, and the routine proceeds to step S302.

In step S302, the timer prescribed value is calculated based on the characteristics for the separation Ss obtained in step S301 and the preset timer prescribed value, whereupon the routine proceeds to step S303. As shown in the drawings, the timer prescribed value is a constant value when the separation Ss is small, but decreases in proportion to the separation Ss when the separation Ss is greater than a set value Ssa, and then becomes constant when the separation Ss is equal to or greater than a set value Ssb.

In step S303, the variation ΔS is calculated from formula (6) above using the current wheel speed differential S and the wheel speed differential S_z of the previous iteration, and the routine then proceeds to step S304.

In step S304, the timer prescribed amount is calculated based on the characteristic of the variation ΔS obtained in step S303 and the preset timer prescribed amount, and the routine then proceeds to step S305. As shown in the drawings, the timer prescribed value is a constant value when the variation ΔS is small, but decreases in proportion with the variation ΔS when the variation ΔS is above a set value ΔSa, and then becomes constant when the variation ΔS is at or above a set value ΔSb.

In step S305, the lateral acceleration GY arising in the vehicle is calculated, and the routine then proceeds to step S306.

In step S306, the timer prescribed value is calculated based on the characteristics of the lateral acceleration GY obtained in step S305 and the preset timer prescribed amount, and the routine then proceeds to step S307. The timer prescribed amount with respect to the lateral acceleration GY, as shown in the drawings, is a constant value up until the lateral acceleration GY reaches a set value GYa, decreases in proportion to the lateral acceleration GY when the set value GYa has been exceeded, and becomes constant when the lateral acceleration GY is at or above a set value GYb.

In step 307, the minimum values for the timer prescribed amounts obtained in steps S302, S304, and S306 are selected as the timer prescribed values, and the process of a single control period ends.

(Operation of the First Embodiment)

The operation of the first embodiment is described next.

In describing the operation of the first embodiment, the operation of a comparative example is described first with reference to the drawings in order to elucidate the problems that are to be solved.

Figure 8:
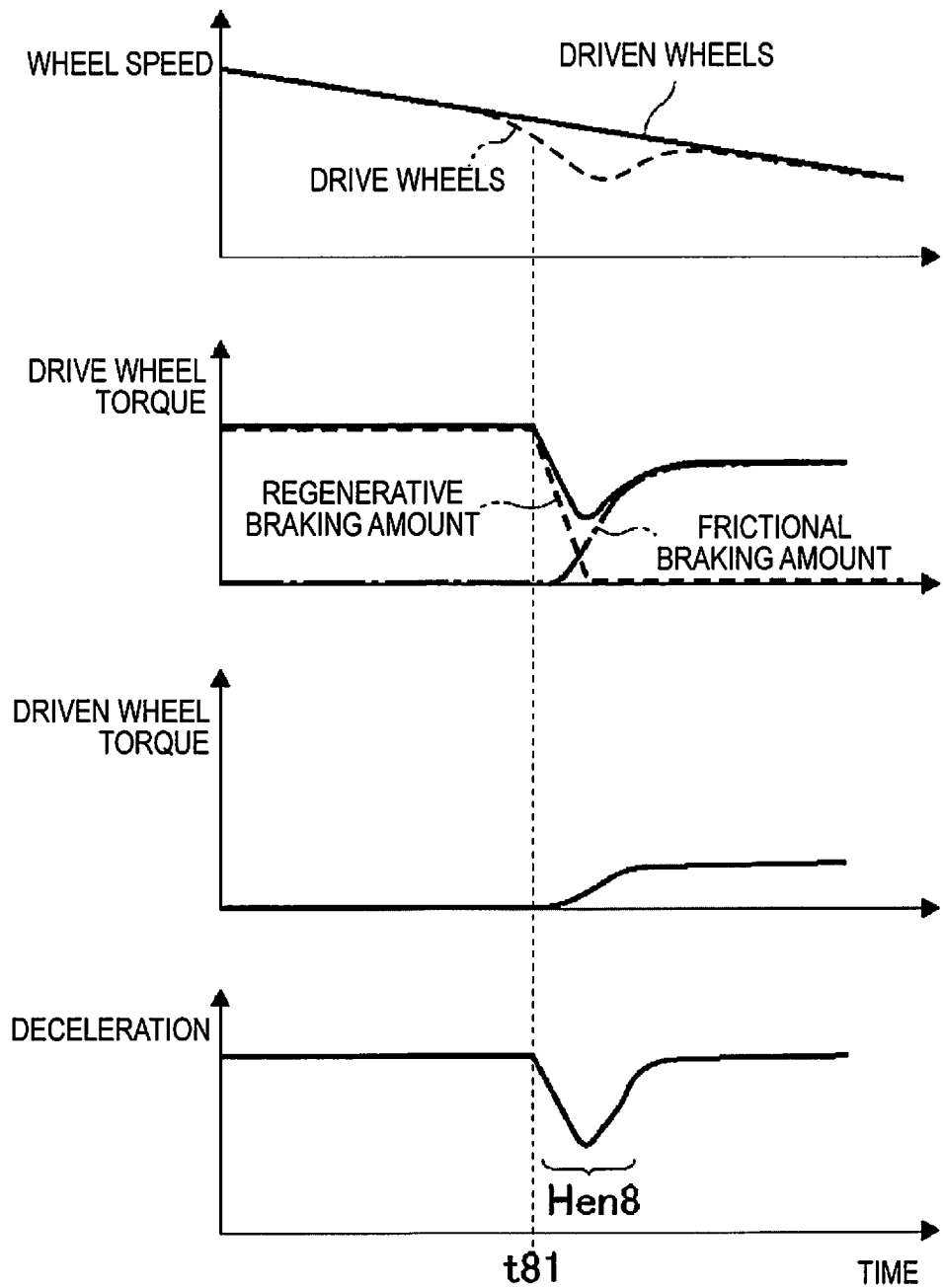
FIG. 8 is a timing chart showing a comparative operational example for a case in which the decrease in gradient is relatively sudden.

The comparative example shows a case where the control operation is carried out. As shown in FIG. 8, in order to carry out regenerative braking in addition to friction braking at the drive wheels (front wheels) in a case where the wheel speed has decreased, the wheel speed (dotted line) has decreased more than the wheel speed (solid line) of the driven wheels (rear wheels).

Thus, at time t81, the wheel speed differential between the drive wheels and the no-drive wheels becomes greater than the restriction initiation threshold value, and the regenerative restriction part restricts the regenerative braking amount. In this case, the decrease in gradient of the regenerative braking amount is constant in the comparative example.

In addition, in the comparative example of FIG. 8, the decrease in gradient is set to be large (rapid) in order that the braking amount of the regenerative braking wheels is at or below the torque corresponding to road surface coefficient of friction (in order that the wheel speed differential S becomes the target threshold value).

In this case, the fluctuation amount of the deceleration increases as shown in the drawing (Hen8 region in the drawing) due to the response delay of the hydraulic braking force, and the driver may experience an uncomfortable sensation.

Figure 9:
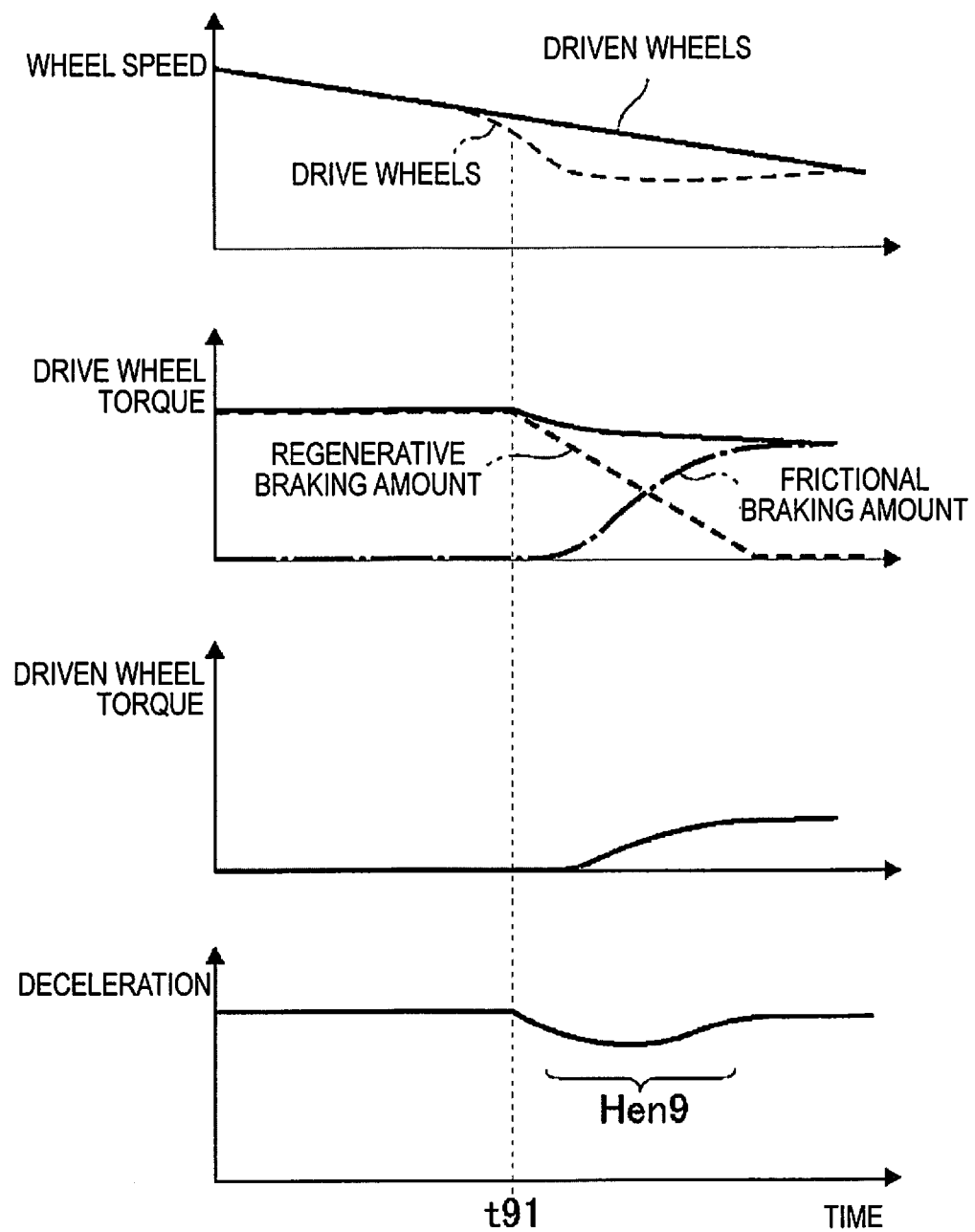
FIG. 9 is a timing chart showing a comparative operational example for a case in which the decrease in gradient is relatively gradual.

On the other hand, FIG. 9 shows an example in which, in order that the driver not experience an uncomfortable sensation as described above, the decrease in gradient during regenerative braking restriction is set to be smaller (more gradual) than in the comparative example of FIG. 8.

In the comparative example of FIG. 9, at time t91, the wheel speed differential between the drive wheels and the driven wheels becomes greater than the restriction initiation threshold value, and the regenerative restriction part restricts the regenerative braking amount.

In this case, because the decrease in gradient of the regenerative braking amount is gradual, the fluctuation in deceleration due to restriction (Hen9 region in the drawing) is kept small.

However, recovery of the wheel speed of the drive wheels, as indicted by the dotted line in FIG. 9, is slower than in the comparative example of FIG. 8, lengthening the condition in which the wheel speed differential is large. There thus is the danger that a condition will arise involving unstable vehicle behavior such as understeering or oversteering.

(Operation Example of the First Embodiment)

An aim of the first embodiment is to resolve the above problems. An operational example thereof described below using the timing chart of FIG. 7.

As with the comparative example shown in FIGS. 8 and 9, at time point t70, the driver executes a braking operation, and the target braking torque Ts is calculated based on the pedal depression force and the pedal stroke (step S1). Next, a braking force is generated to the respective wheels 1a, 1b by the hydraulic braking device A and the regenerative braking device B so that the target braking torque Ts is obtained.

At this time, in the first embodiment, regenerative braking force is generated only for the drive wheels (front wheels) 1a, 1a from the braking initiation time t70 to t71 in order to obtain as much regenerative braking force as possible, thereby efficiently recovering energy.

When braking is carried out only at the drive wheels 1a, 1a in this manner, there are cases in which the amount of decrease in speed of the drive wheels 1a, 1a is excessively greater than the decrease in speed of the driven wheels 1b, 1b corresponding to the car body speed. In such cases, if the wheel speed differential S between the drive wheels 1a, 1a and the driven wheels 1b, 1b becomes too great, then unstable vehicle behavior may result.

Thus, in the first embodiment, the wheel speed differential S is calculated, and the regenerative braking amount is restricted if this wheel speed differential S is greater than the restriction initiation threshold value.

Figure 7:
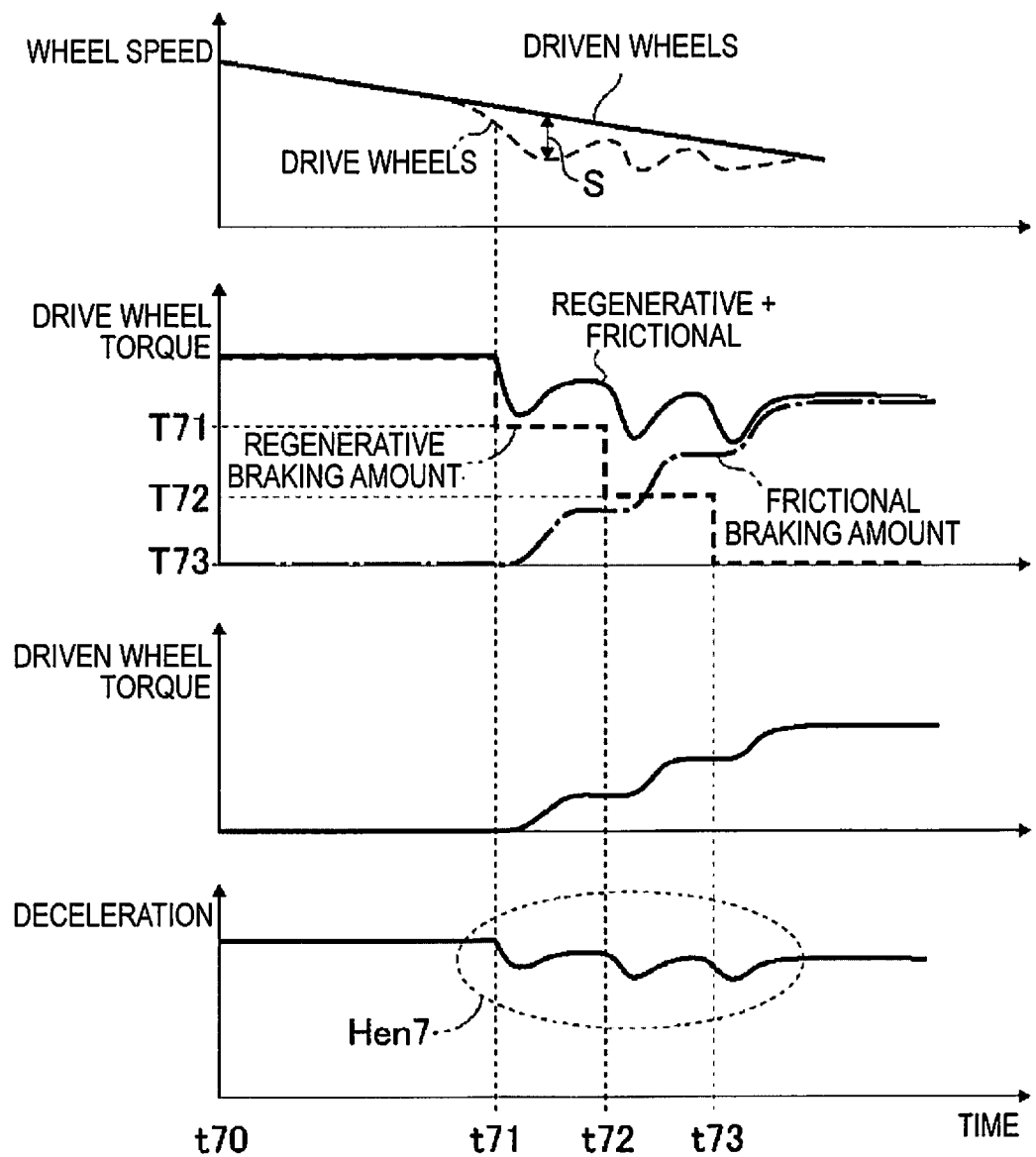
FIG. 7 is a timing chart showing an operational example during the braking operation in the braking control device according to a first embodiment.

Specifically, in the timing chart of FIG. 7, time t71 is the time at which the wheel speed differential S becomes greater than the restriction initiation threshold value and restriction of the regenerative braking amount is initiated (time at which the determination of YES is made in step S4 and the routine proceeds to step S5).

As a result, the regenerative restriction value Tmcom is calculated based on the processes of steps S5→S7→S8, the regenerative restriction value Tmcom is sent to the motor controller 11, the friction braking command value Tb is calculated (step S12), and friction braking is carried out (step S13).

As a result, as shown in FIG. 7, at the drive wheels (front wheels), the regenerative braking amount decreases from time t71 and gradually slows with the friction braking amount rising. Simultaneously, at the driven wheels (rear wheels), gradual slowing occurs at time t71, with the friction braking amount rising.

At this time, in the first embodiment, during restriction of regenerative braking, restriction in accordance with the large restriction phase in which the decrease in gradient is large and restriction in accordance with the small restriction phase in which the decrease in gradient is small are carried out by alternate repetition. Specifically, at time t71, the regenerative braking amount decreases suddenly until T71, which corresponds to the large restriction phase. Then, from a time point that is immediately after this large restriction phase (roughly at t71) until t72, there is almost no change in the regenerative braking amount, which corresponds to the small restriction phase.

In addition, at time t72, the regenerative braking amount decreases suddenly from T71 to T72, and this period corresponds to the large restriction phase. In addition, starting from a time point that is immediately after this large restriction phase (roughly at t72), until t73, there is almost no change in the regenerative braking amount, and this period corresponds to the small restriction phase.

Similarly, at time t73, the regenerative braking amount decreases suddenly from T72 to T73, and this period corresponds to the large restriction phase.

In the manner described above, there is a roughly stepwise decrease in the regenerative braking amount as shown in FIG. 7. Then, in response, a slight delay occurs, and the friction braking amount, increases gradually in a stepwise manner in accordance with the hydraulic braking force on the drive wheels (front wheels) 1a, 1a and the driven wheels (rear wheels) 1b, 1b.

Consequently, as shown in FIG. 7, the fluctuation in deceleration (portion of the region Hen7) is suppressed in comparison to the comparative example shown in FIG. 8. In addition, the timing in which the wheel speed of the drive wheels 1a, 1a recovers to the wheel speed of the driven wheels 1b, 1b is more rapid than in the comparative example shown in FIG. 9.

Figure 4:
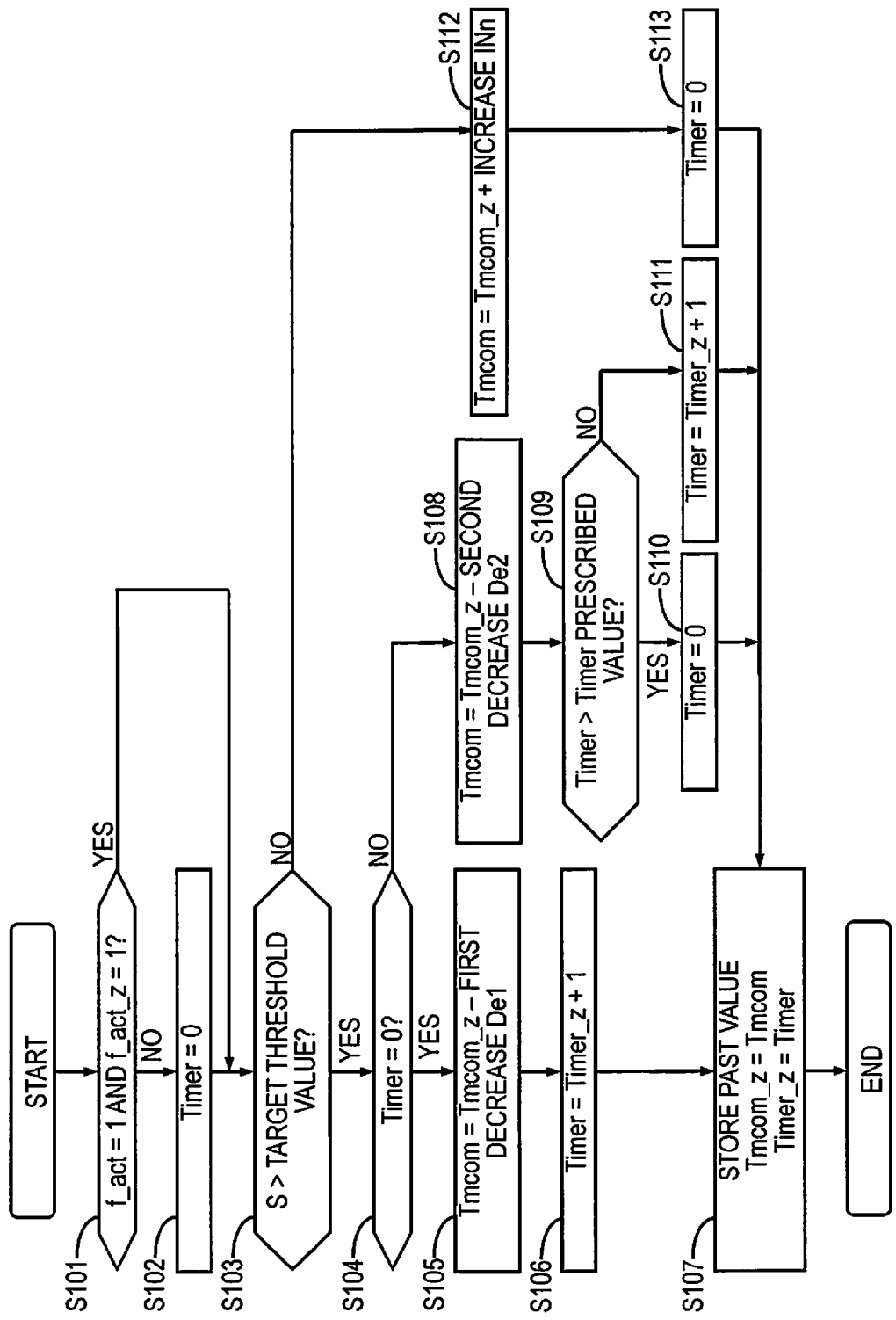
FIG. 4 is a flow chart showing the flow of computational processes on the regenerative restriction values in the braking control device according to a first embodiment.

The timing of switching between the large restriction phase and small restriction phase during restriction of the regenerative braking amount and the restriction amount are carried out based on steps S103 to S111 shown in FIG. 4. Specifically, in the timing of initiation of restriction of the regenerative braking amount, the regenerative braking amount is decreased only by the first decrease De1 in the first period of restriction (step S103→S104→S105). Then, the regenerative braking amount is decreased by the second decrease De2 each restriction period until the count value Timer of the timer that has begun counting at this time exceeds the timer prescribed value (steps S104→S108→S109).

In addition, once the timer count value Timer has reached the timer prescribed value, a decrease in the regenerative braking amount by the first decrease De1 of the first period of the restriction is carried out again. Subsequently, a decrease in the regenerative braking amount by the second decrease De2 is repeatedly carried out each restriction period until the timer count value Timer exceeds the timer prescribed value.

In the manner described above, the large restriction phase and small restriction phase are repeated in accordance with the operation described above, and the regenerative braking amount undergoes a roughly stepwise decrease as shown in FIG. 7.

(Effect of the First Embodiment)

The effects of the braking restriction device of the first embodiment are described below.

(a) The braking restriction device of the first embodiment is characterized by comprising:

a system controller 10 and motor controller 11 used as a regenerative braking control part that carry out regenerative braking only at the drive wheels 1a, 1a of the front and back wheels based on a deceleration request operation;

a wheel speed differential detection part that determines the wheel speed differential S between the driven wheel speed and the regenerative braking wheel speed (drive wheel speed) (step S3); and a regenerative restriction part (part for carrying out the flow chart of FIG. 2) that restricts the regenerative braking amount when the wheel speed differential S exceeds a restriction initiation threshold value;

the regenerative restriction part, during restriction, repeatedly carrying out restriction in accordance with a large restriction phase in which the decrease in gradient of the regenerative braking amount is large and restriction in accordance with a small restriction phase in which the decrease in gradient is small.

As a result, rapid recovery from slip states in the drive wheels due to regenerative braking is possible, and the generation of states leading to unstable vehicle behavior can be suppressed by carrying out a restriction in accordance with a large restriction phase in which the decrease in gradient of the regenerative braking amount is large. In conjunction, fluctuation in deceleration due to response lag of the hydraulic braking device A can be kept small by restriction in accordance with a small restriction phase in which the decrease in gradient of the regenerative braking amount is small.

(b) The restriction braking device of the first embodiment is characterized by comprising a hydraulic braking device A for causing a hydraulic braking force to act on the front and rear wheels, the regenerative restriction part setting the decrease in gradient during the large restriction phase to a decrease in gradient that is faster than the response speed of the hydraulic braking force, and setting the decrease in gradient of the small restriction phase to a decrease in gradient that is slower than the response speed of the hydraulic restriction force, including a decrease in gradient of 0.

Consequently, with restriction in accordance with the large restriction phase, rapid recovery from slip states due to regenerative braking of the drive wheels is possible, and the generation of states leading to unstable vehicle behavior can be suppressed due to a decrease in gradient that is more rapid than the response speed of the hydraulic braking force. In conjunction, fluctuation in deceleration resulting from an increase in response lag of the hydraulic braking force can be kept small due to a decrease in gradient that is slower than the response speed of the hydraulic braking force in accordance with the small restriction phase. In particular, because the hydraulic braking device A has a response lag with respect to the hydraulic braking force, the restriction described in this embodiment is effective.

In addition, the restriction braking device of the first embodiment is characterized in that the regenerative restriction part, based on timer settings, applies restriction in accordance with the small restriction phase during the period from after application of restriction in the large restriction phase at least up until completion of the rise in the braking force of the hydraulic braking device A.

Consequently, it is possible to reliably produce the effect of maintaining a small fluctuation in deceleration with the rise in hydraulic braking force due to response delay.

Figure 5:
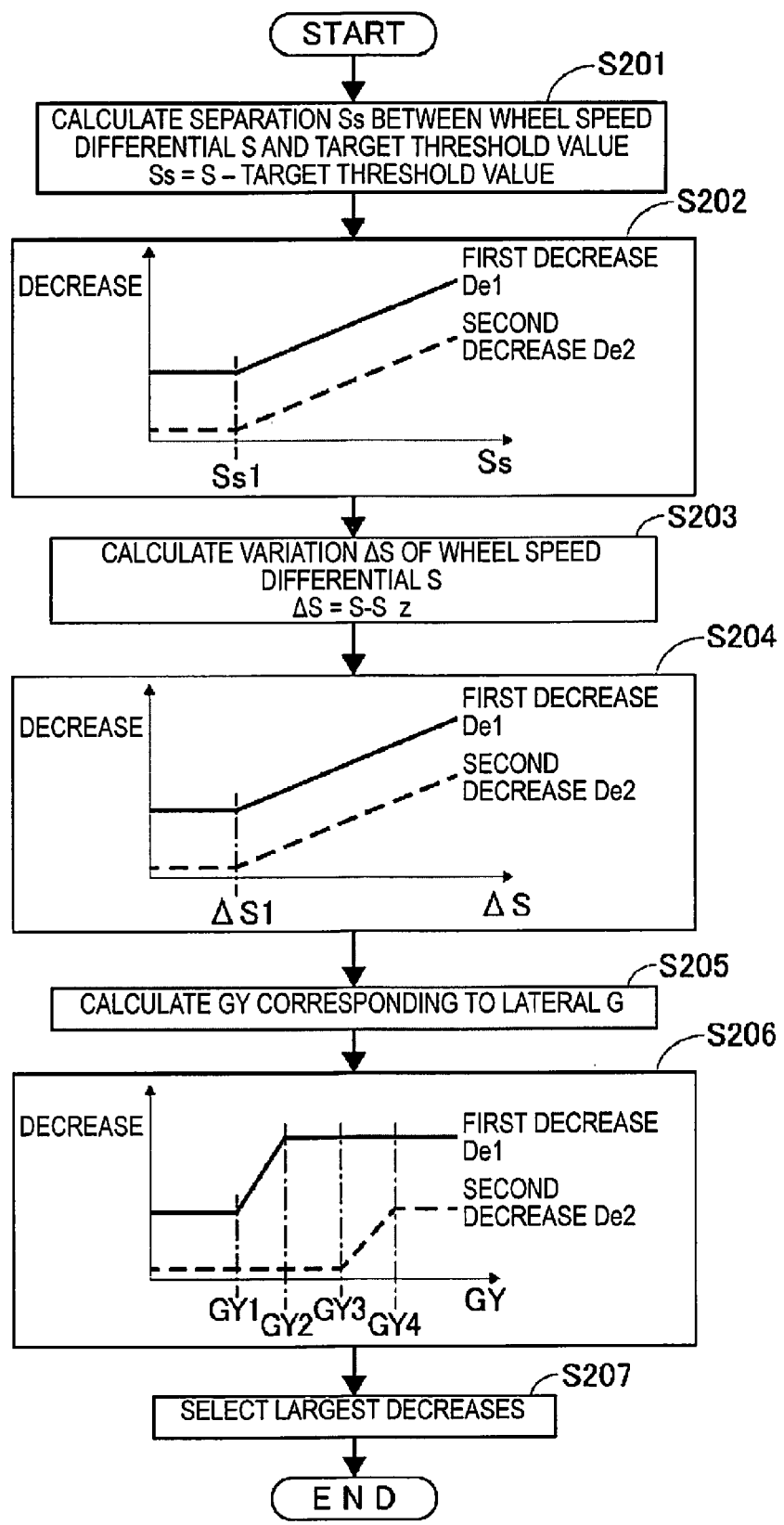
FIG. 5 is a flow chart showing the flow of computational processing for the first decrease De1 and second decrease De2 in the braking control device according to a first embodiment.

(c) The restriction control device of the first embodiment is characterized in that the regenerative restriction part sets the first decrease De1 that determines the decrease in gradient for the large restriction phase and the second decrease De1 that determines the decrease in gradient for the small restriction phase to increase as the wheel speed differential S increases, as shown in step S202 of the flow chart of FIG. 5.

Specifically, as the wheel speed differential S increases, the slip state of the drive wheels 1a, 1a increases. Thus, the decreases De1, De2 are both set to be higher, and the decrease in gradient is made to be sudden for larger values of the wheel speed differential S, thereby allowing rapid recovery of the drive wheels 1a, 1a from the slip state.

In a linear travel state, when the slip state of the drive wheels 1a, 1a is neglected, ABS control may at times be carried out at the drive wheels 1a, 1a. With this ABS control, the vehicle deceleration at which ABS control is initiated is typically set to be lower with regenerative braking in comparison to friction braking, and thus early operation of ABS control can be felt. However, this also can be prevented.

(d) The braking control device of the first embodiment is characterized by comprising a lateral acceleration sensor for detecting the lateral acceleration GY as the turning state of the vehicle (S205), the regenerative restriction part, as shown in step S206 of the flow chart of FIG. 5, setting the first decrease De1 that determines the decrease in gradient for the large restriction phase and the second decrease De1 that determines the decrease in gradient for the small restriction phase to increase as the lateral acceleration GY representing the turning state of the vehicle increases (step S206).

When the vehicle is in a turning state, understeering or oversteering behavior tends to arise due to slipping of the regenerative braking wheels (drive wheels). It is therefore possible to stabilize this behavior by rapidly decreasing the braking torque on the regenerative braking wheels.

(e) The braking control device of the first embodiment is characterized by comprising a slip detector for detecting the change amount ΔS of the wheel speed differential S as the slip variation amount of the regenerative braking wheels (step S203), the regenerative restriction part, as shown in step S204 of the flow chart of FIG. 5, setting the first decrease De1 that determines the decrease in gradient for the large restriction phase and the second decrease De1 that determines the decrease in gradient for the small restriction phase to increase as the change amount ΔS of the wheel speed differential S representing the variation amount of slip increases (step S204).

When the slip variation amount (variation amount ΔS) is large, this subsequently indicates that the slip amount itself is large. For this reason, it is possible to suppress the occurrence of slipping at the regenerative braking wheels (drive wheels) by increasing the decrease in gradient.

(f) The braking control device of the first embodiment is characterized in that the regenerative restriction part sets the timer prescribed value that determines the time of each of the restriction phases to be shorter as the separation Ss between the wheel speed differential S and the target threshold value increases (step S302).

In this manner, restriction of the regenerative restriction amount is repeated over a short time period in accordance with the large restriction phase as the separation Ss between the wheel speed differential S and the target threshold value increases, and the restriction torque of the regenerative braking wheels decreases rapidly in comparison to the case where both are repeated over a long period of time. Consequently, rapid recovery of the drive wheels 1a, 1a from a slip state can be accomplished in the same manner as in (2) above. In addition, it is possible to prevent imparting the sensation of ABS control early operation.

(g) The restriction control device of the first embodiment is characterized by comprising a lateral acceleration sensor for detecting the lateral acceleration GY as the turning state of the vehicle (step S305), the regenerative restriction part setting the timer prescribed value that determines the times of each of the restriction phases to be shorter as the lateral acceleration GY representing the turning state of the vehicle increases (step S306).

Due to slipping of the regenerative braking wheels (drive wheels), understeering or oversteering behavior readily arises. For this reason, restriction in accordance with the large restriction phase and small restriction phase is repeated over a short time period, so that the braking torque at the regenerative braking wheels is rapidly decreased in comparison to repeating the two over a long time period, thereby allowing stabilization of the behavior.

(h) The restriction control device of the first embodiment is characterized by comprising a slip detection part for detecting the slip variation amount ΔS of the wheel speed differential S as the slip variation amount of the regenerative braking wheels (step S303), the regenerative restriction part setting the timer prescribed value that determines the times of each of the restriction phases to be shorter as the variation amount ΔS of the wheel speed differential S that is taken as the slip variation amount increases (step S304).

When the slip variation amount (variation ΔS) is large, this indicates that subsequently the slip amount itself will become large. For this reason, restriction in accordance with the large restriction phase and small restriction phase is repeated over a short time period, so that the braking torque at the regenerative braking wheels is rapidly decreased in comparison to repeating the two over a long time period, thereby allowing behavior stabilization.

When the slip variation amount is large, this indicates that subsequently the sip amount itself will become large. Thus, the restriction gradient is increased, facilitating slip suppression.

(Other Embodiments)

Other embodiments are described below.

In describing the other embodiments, those portions that shared by the first embodiment are not described. Only differences relative to the first embodiment are described.

(Second Embodiment)

The second embodiment is a modification example of control for the portion that determines the decrease in gradient in the regenerative restriction part for restricting the regenerative braking amount when the wheel speed differential S is larger than the restriction initiation threshold value during regenerative braking. The other aspects of control are the same as in the first embodiment.

Figure 10:
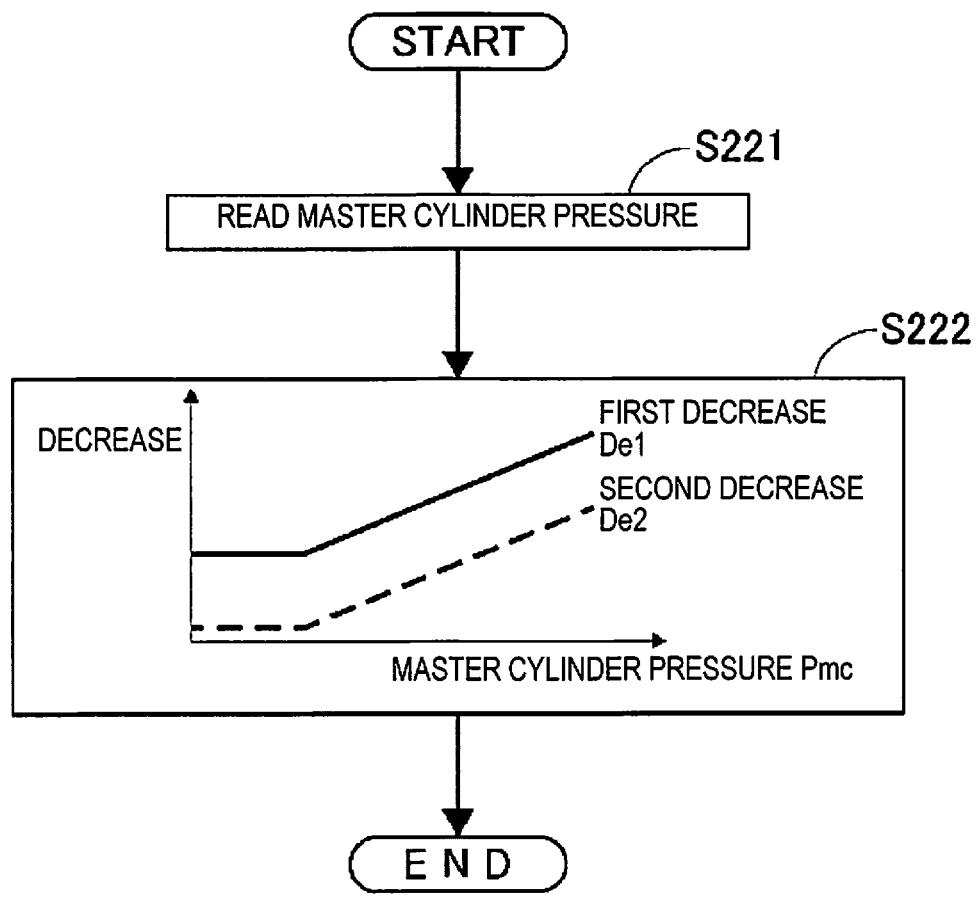
FIG. 10 is a diagram of the decrease characteristics showing the relationship between the master cylinder pressure and the first decrease and second decrease that determine the decreases in gradient during regenerative restriction control in the braking control device of a second embodiment.

In the second embodiment, as shown in FIG. 10, the master cylinder pressure Pmc that is taken as the friction braking force is read in step S221. The timing of reading of the master cylinder pressure Pmc is at the time when a determination of YES is made in step S4 or is the time at which the process of step S221 is carried out at a subsequent time.

In the next step S222, the first decrease De1 and the second decrease De2 are calculated based on the master cylinder pressure Pmc that has been read in step S221 and the preset characteristics of the respective decreases De1, De2. Specifically, the two decreases De1 and De2 are set to be smaller for smaller master cylinder pressures Pmc.

The two decreases De1, De2 may be determined only in step S222, or some or all of the calculations in accordance with step S202, S204, S206 described in the first embodiment may be carried out, and, among them, the largest decreases may be selected.

(i) The braking control device of the second embodiment is characterized in that the regenerative restriction part sets the first decrease De1 that determines the decrease in gradient for the large restriction phase and the second decrease De1 that determines the decrease in gradient for the small restriction phase to decrease as the master cylinder pressure Pmc used as the friction braking force at initiation of restriction decreases.

When the master cylinder pressure (friction braking force) Pmc is small, a master cylinder pressure Pmc within a region having a small rise at initial depression of the brake pedal 5 is used, and so the response of the frictional braking force is particularly low in comparison to other regions.

Thus, by decreasing the two decreases De1, De2 (decreases in gradient) in the region where the master cylinder pressure (friction braking force) Pmc is small, the occurrence of fluctuation in deceleration can be suppressed. In addition, rapid recovery of the drive wheels 1a, 1a from a slip state can be expected, even when the variation in braking force has a small decrease in gradient, because a region was used from the start wherein the frictional braking force is small and response is poor.

(Third Embodiment)

The third embodiment is different from the first embodiment in regard to switching from the small restriction phase to the large restriction phase in the calculation process for the regenerative restriction value Tmcom. Specifically, the example is one in which switching from the small regenerative phase to the large regenerative phase is carried out upon detection of a frictional braking force corresponding to the regenerative decrease in accordance with regenerative restriction.

Figure 11:
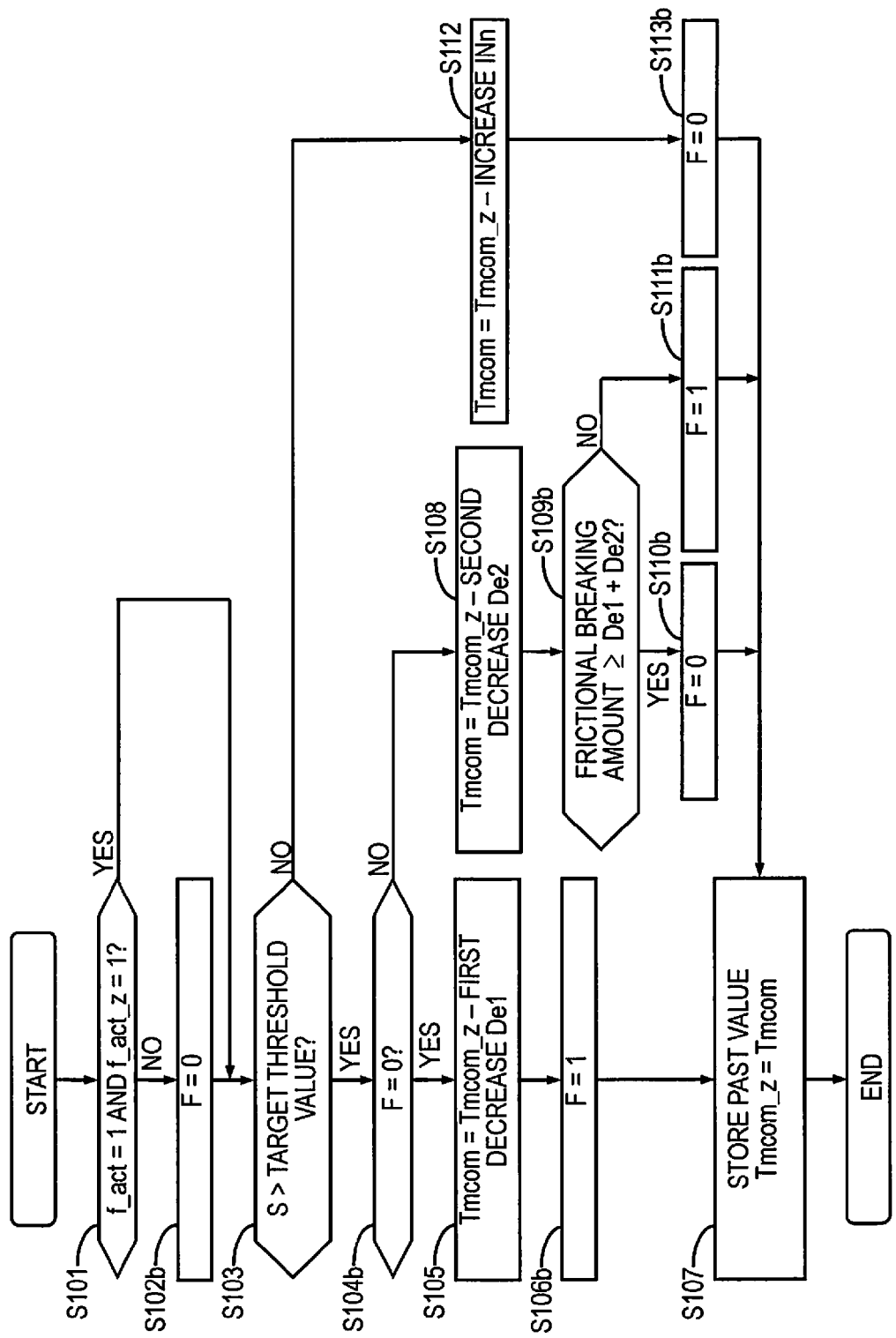
FIG. 11 is a flow chart showing the processing flow for the portion related to switching control between the large restriction phase and small restriction phase during regenerative restriction control in the braking control device according to a third embodiment.

FIG. 11 is a flow chart showing the flow of processing in the calculation processes for the regenerative restriction value Tmcom during regenerative restriction in the third embodiment.

In the flow chart, differences with respect to the flow chart of FIG. 4 used in the description of the first embodiment are described.

In step S102b that is reached after a NO determination in step S101, the switching flag F is set to 0.

In addition, in step S104b that is reached after a YES determination in step S103, it is determined whether the switching flag F is 0. If F=0, then the routine proceeds to step S105, and if F≠0, then the routine proceeds to step S108.

In step S109b that is reached after the processing of step S108, for example, a determination is made as to whether the friction braking amount represented by the master cylinder pressure Pmc is at or above a value resulting from addition of the first decrease De1 and the second decrease De2, which is the value at which the regenerative braking amount has been restricted. If the result is YES in step S109b, then the routine proceeds to step S110b, where the switching flag F is set to 0. In addition, in the third embodiment, the switching flag F is set to 0 in step S113b as well.

On the other hand, if the determination is NO in step S109b, then the routine proceeds to step S111b, and the switching flag F is set to 1. In the third embodiment, the switching flag F is set to 1 in step S106b as well.

In the third embodiment 3 in which calculation of the regenerative restriction value Tmcom is carried out in the manner described above, when the wheel speed differential S exceeds the restriction initiation threshold value (determination of YES in step S101), then the processes of step S103→S104b→S105 are carried out. Consequently, a value obtained by subtracting the first decrease De1 is used as the regenerative restriction value Tmcom, and restriction in accordance with the large restriction phase is carried out only in one period of control.

In addition, at this time, the switching flag F is set to 1, and subsequently restriction of the small restriction phase is carried out in accordance with the processes of steps S104b→S108. Next, the friction braking amount rises in accordance with restriction of the regenerative braking amount, and the friction braking amount becomes the amount obtained as a result of a decrease in accordance with regenerative restriction, specifically, the amount obtained by adding both the decrease De1, and De2, which process is carried out until a determination of YES is made in step S109b.

Subsequently, at the point when the friction braking amount becomes an amount corresponding to the amount resulting from the decrease carried out in accordance with regenerative restriction, the process S109b→S110b is carried out, the switching flag F is set to 0, and the phase is switched to the large restriction phase in accordance with the processes of steps S103→S104b→S105.

(j) As in the above, the third embodiment is characterized by comprising a master cylinder pressure sensor 102 used as the friction braking force detection part for detecting the friction braking forces at the front and rear wheels, the regenerative restriction part switching from the small restriction phase to the large restriction phase upon detecting the generation of a friction braking force corresponding to the regenerative decrease according to regenerative restriction (step S109*b*).

In this manner, in the third embodiment, regenerative restriction is carried out in accordance with the subsequent large decrease in gradient when it is detected that the increase in friction braking amount has caught up with the decrease in regenerative braking amount due to regenerative restriction. Fluctuation in deceleration thus can be greatly suppressed.

Although the braking control device of the present invention was described above based on embodiments, the specific configuration is not restricted to these embodiments, and alterations or amendments to the design are allowed, within a scope that does not exceed the gist of the inventions as defined in the claims.

In the embodiments, examples were presented in which the braking control device of the present invention was used in an electric car, but applications of the present invention are not restricted to electric cars, provided that the vehicle has a hydraulic braking device and a regenerative braking device. For example, the invention may be used in a hybrid car in which an engine and a motor/generator are installed as drive sources for the drive wheels. In addition, the hybrid car may be a series system in which an engine is installed as the electrical generation device, and the drive power thereof is not transferred to the drive wheels, or a parallel system in which the drive power of the engine can be transferred to the drive wheels along with the drive power of the motor. In addition, the invention may also be used in vehicles that are designed so that the drive wheels are driven only with the drive power from the engine, but regenerative braking can be carried out.

In the embodiments, a hydraulic braking device was described as the braking device for generating friction braking force, but a braking device also may be used in which the frictional braking force is generated using another electric motor or the like as a drive source.

In the embodiments, the first decrease De1 and the second decrease De2 that define the decreases in gradient will vary in accordance with the wheel speed differential S, the variation amount ΔS, and the lateral acceleration GY, and the maximum values of the respective decreases De1, De2 are used as the respective decreases De1, De2. However, the invention is not restricted to this, and only one of the two decreases De1 and De2 may be made variable. In addition, when either one or both of the decreases De1 and De2 are made variable in this manner, the values may be made to vary in accordance with just one of the wheel speed differential S, the variation amount ΔS, the lateral acceleration GY, and the frictional braking amount (master cylinder pressure Pmc) described in the first embodiment and the second embodiment.

In addition, the decrease in gradient in the large restriction phase and the decrease in gradient in the small restriction phase are not limited to the embodiments, but may be suitably set at optimal decreases in gradients. In this case, the decrease in gradient in the large restriction phase is preferably faster than the response speed of the hydraulic braking force, but the decrease in gradient may be set to be slower than as described in the embodiments. In addition, the decrease in gradient in the small restriction phase is preferably slower than the response speed of the hydraulic braking force, but the decrease in gradient may be set to be faster than as described in the embodiments, or the decrease in gradient may be set to 0.

In addition, in the embodiments, a lateral acceleration sensor for detecting the lateral acceleration GY was described as means for detecting the state of turning of the vehicle, but the invention is not restricted to this. For example, GPS data or the like may be used, or one or both of steering angle data and yow rate data may be used.

In addition, in the embodiments, the timer prescribed value varied in accordance with the wheel speed differential S, the variation amount ΔS, and the lateral acceleration GY, but the invention is not restricted thereby. The value thus may vary in accordance with just one of the wheel speed differential S, the variation amount ΔS thereof, and the lateral acceleration GY.

In addition, in the embodiments, when setting the timer prescribed value in the regenerative restriction part, the timer prescribed value for defining the respective restriction phase times was set to be shorter as the separation Ss between the wheel speed differential S and the target threshold value increased. However, as described in claim 6 of this application, if the respective restriction phase times are made shorter as the wheel speed differential S increases, then the timer prescribed value may be set in accordance with absolute value of the wheel speed differential S, not based on the separation Ss.

The invention claimed is:

1. A braking control device, comprising:
a regenerative braking control part configured to carrying out regenerative braking only on the drive wheels of the front and back wheels based on a deceleration request operation;
a wheel speed differential detection part configured to determine a wheel speed differential between the driven wheel speed and the regenerative braking wheel speed; and
a regenerative restriction part configured to restrict the regenerative braking amount when the wheel speed differential exceeds a restriction initiation threshold value,
the regenerative restriction part, during restriction of the regenerative braking amount, being configured to repeatedly carrying out a restriction in accordance with a large restriction phase in which a decrease in gradient of the regenerative braking amount is large and a restriction in accordance with a small restriction phase in which the decrease in gradient is small.

2. The braking control device according to claim 1, further comprising
a hydraulic braking device configured to cause a hydraulic braking force to act on the front and rear wheels,
the regenerative restriction part configured to set the decrease in gradient during the large restriction phase to a decrease in gradient faster than the response speed of the hydraulic braking force, and to set the decrease in gradient of the small restriction phase to a decrease in gradient slower than the response speed of the hydraulic restriction force, including a decrease in gradient of 0.

3. The braking control device according to claim 2, wherein
the regenerative restriction part is configured to apply a restriction during the small restriction phase during the period from after application of the restriction in the large restriction phase at least up until completion of a rise in the braking force of the hydraulic braking device.

4. The braking control device according to claim 1, wherein the regenerative restriction part is configured to set at least one of the decrease in gradient of the large restriction phase and the decrease in gradient of the small restriction phase to an increase, as the wheel speed differential increases.

5. The braking control device according to claim 1, further comprising
a detection part configured to detect a turning state of a vehicle,
the regenerative restriction part being configured to increase at least one of the decrease in gradient of the large restriction phase and the decrease in gradient of the small restriction phase, as the value representing the turning state of the vehicle increases.

6. The braking control device according to claim 1, further comprising
a slip detection part configured to detect the slip variation amount of the regenerative braking wheels,
the regenerative restriction part being configured to increase at least one of the decrease in gradient of the large restriction phase and the decrease in gradient of the small restriction phase, as the slip variation amount increases.

7. The braking control device according to claim 1, further comprising
a friction braking force detection part configured to detect the friction braking force at the front and rear wheels,
the regenerative restriction part being configured to set at least one of the decrease in gradient of the large restriction phase and the decrease in gradient of the small restriction phase to decrease, as the friction braking force decreases during initiation of the restriction.

8. The braking control device according to claim 1, wherein
the regenerative restriction part is configured to set the time of one period of the large and small restriction phases to be shorter, as the wheel speed differential increases.

9. The braking control device according to claim 1, further comprising
a detection part configured to detect a turning state of a vehicle,
the regenerative restriction part being configured to repeatedly shorten the time duration of a first period of the large and small restriction phases, as the value representing the turning state of the vehicle increases.

10. The braking control device according to claim 1, further comprising
a slip detection part configured to detect the slip variation amount of the regenerative braking wheels,
the regenerative restriction part being configured to repeatedly shorten the duration of a first period of the large and small restriction phases, as the slip variation amount increases.

11. The braking control device according to claim 1, further comprising
a friction braking force detection part being configured to detect the friction braking force at the front and rear wheels,
the regenerative restriction part being configured to detect the production of a friction braking force corresponding to a regenerative decrease due to the regenerative restriction and to switch from the small restriction phase to the large restriction phase.

12. The braking control device according to claim 2, wherein
the regenerative restriction part is configured to set at least one of the decrease in gradient of the large restriction phase and the decrease in gradient of the small restriction phase to an increase, as the wheel speed differential increases.

13. The braking control device according to claim 3, wherein
the regenerative restriction part is configured to set at least one of the decrease in gradient of the large restriction phase and the decrease in gradient of the small restriction phase to an increase, as the wheel speed differential increases.

14. The braking control device according to claim 2, further comprising
a detection part configured to detect a turning state of a vehicle,
the regenerative restriction part being configured to increase at least one of the decrease in gradient of the large restriction phase and the decrease in gradient of the small restriction phase, as the value representing the turning state of the vehicle increases.

15. The braking control device according to claim 2, further comprising
a slip detection part configured to detect the slip variation amount of the regenerative braking wheels,
the regenerative restriction part being configured to increase at least one of the decrease in gradient of the large restriction phase and the decrease in gradient of the small restriction phase, as the slip variation amount increases.

16. The braking control device according to claim 2, further comprising
a friction braking force detection part configured to detect the friction braking force at the front and rear wheels,
the regenerative restriction part being configured to set at least one of the decrease in gradient of the large restriction phase and the decrease in gradient of the small restriction phase to decrease, as the friction braking force decreases during initiation of the restriction.

17. The braking control device according to claim 1, further comprising
a detection part configured to detect a turning state of a vehicle,
the regenerative restriction part being configured to repeatedly shorten the time duration of a first period of the large and small restriction phases, as the value representing the turning state of the vehicle increases.

* * * * *